May 27, 1969     A. J. LOUVIERE ET AL     3,447,124
UNDERWATER SURVEY
Filed Sept. 15, 1967

Allen J. Louviere
Leonard S. Nicholson
INVENTORS

BY James F. Weiler
Paul L. DeVerter II
Henry W. Hope
ATTORNEYS

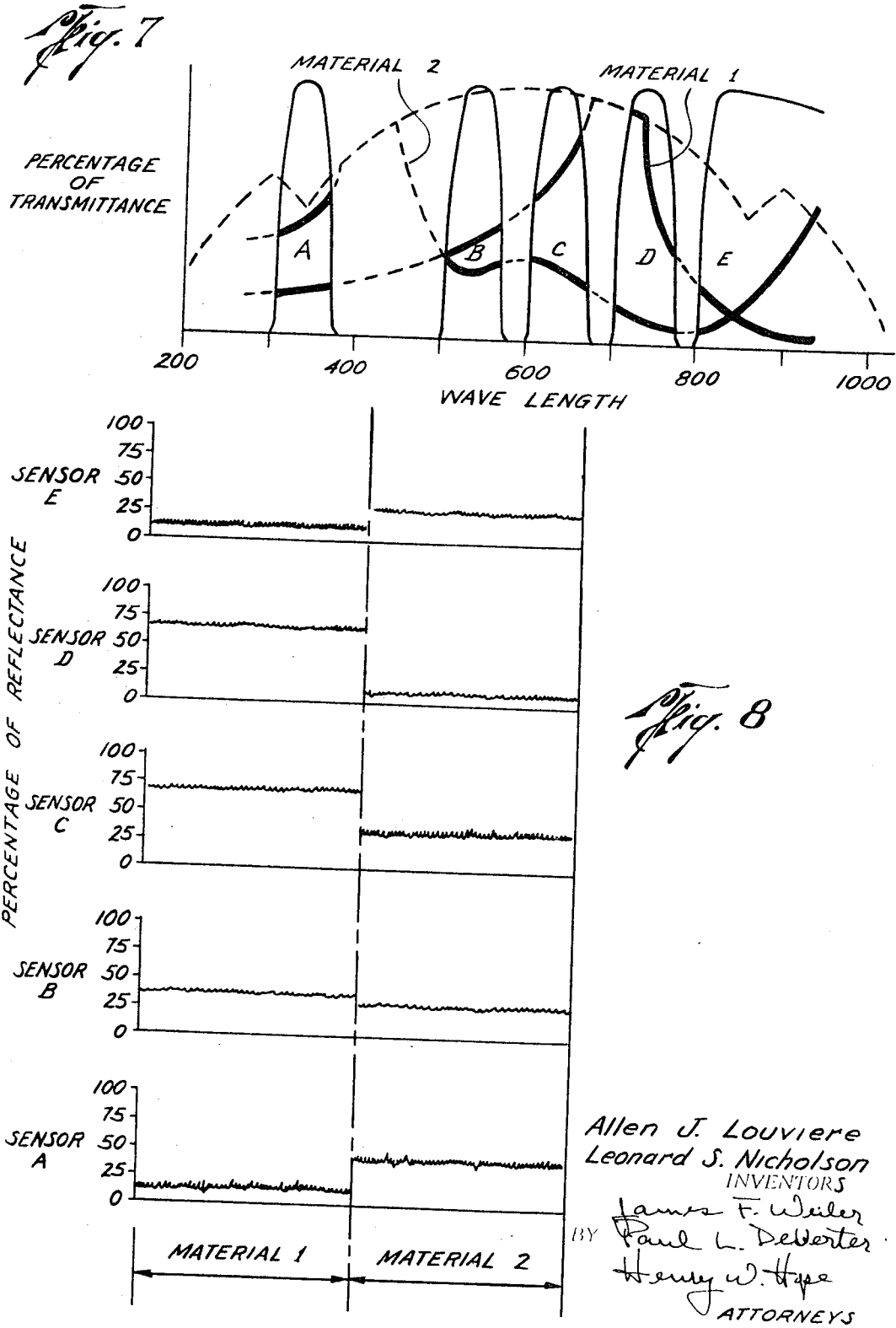

United States Patent Office 3,447,124
Patented May 27, 1969

3,447,124
UNDERWATER SURVEY
Allen J. Louviere, Galveston, Tex. (5001 Bayou Drive, Dickinson, Tex. 77539), and Leonard S. Nicholson, Clear Lake, Tex. (15811 Fathom Lane, Houston, Tex. 77058)
Filed Sept. 15, 1967, Ser. No. 667,903
Int. Cl. G01v 1/38
U.S. Cl. 340—4
10 Claims

ABSTRACT OF THE DISCLOSURE

A source of electromagnetic energy is provided and reflected off of the ocean floor. The reflected spectrum is received by a series of narrow band width sensors and the various amplitudes indicated. Comparison of these amplitudes with the signatures of known materials allows identification of the ocean floor composition. Amplitude changes can also be used to identify changes in composition.

---

Figure 1:
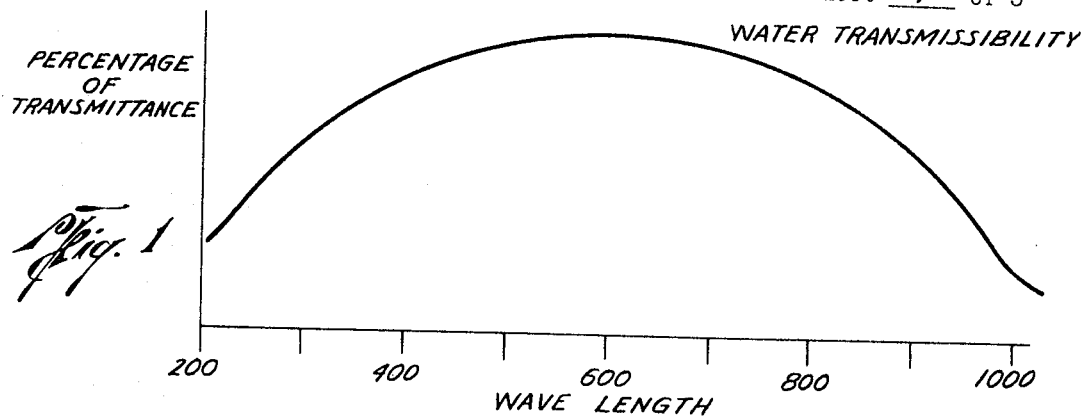

The present invention relates to a method and apparatus for providing an underwater survey, and more particularly relates to the method and apparatus useful in identifying the materials making up the ocean floor by means of a continuous, remote, multi-spectral survey.

The use of multi-spectral photography in the identification of crops, determination of disease, and other characteristics is well known in the art. This technique is fully explained in volume 49, American Scientist, No. 1, of March 1961, in an article by Robert M. Colwell, entitled, "Some Practical Application of Multi-Band Spectral Reconnaissance." The technique generally includes measuring the relative reflectivity of portions of the earth's surface in several distinct spectral bands simultaneously, such as by utilizing appropriate cameras and filters with panchromatic and infrared film, and comparing the results obtained with the known reflectivity within these bands of certain known materials. With this information, it is then possible to determine or distinguish certain crops, and distinguish the presence or absence of disease, and the like. Similar techniques are utilized in other areas of the electromagnetic spectrum, whether the wave length be below ultraviolet or above infrared.

In a particular atmosphere or medium, where electromagnetic energy is impinged upon a material, a certain reflectance curve is received over a range of wave lengths, and this curve is referred to as the "signature" of this certain material. Quite a number of materials have been so catalogued, and it is well known that this reflectance is the basis for the spectrometer, a most useful laboratory tool.

The present invention is concerned with a method and apparatus for surveying the surface of the ocean floor. Unfortunately, ocean water may or may not transmit sunlight, depending upon its clarity, and many other factors, but in any event the transmission of sunlight to great depths is limited. Other portions of the electromagnetic spectrum do not show great transmittability through ocean water; and consequently, the present invention utilizes a portion of the visible spectrum as the window or band through which to detect the presence of various materials on the ocean floor. Since sunlight does not penetrate to any great depth in ocean water, it is an object of the present invention to provide an intense electromagnetic spectrum source having a relatively high emissivity in a range which is compatible with the transmittability of the electromagnetic spectrum in ocean water, and more particularly in the wave length range of 250 through 900 millimicrons.

Upon the impinging of this spectrum on the surface of the ocean floor at a constant intensity, a percentage will be reflected to a group of sensors, each of which is designed to indicate the reflectance within a small band of wave lengths. This measured reflectance by the sensors may then be compared with the known signature of various materials; and, thereby, the present invention is used to determine the materials making up the ocean floor in any particular spot.

In addition to providing the method for underwater survey, it is an object of the present invention to provide an apparatus capable of utilizing the method, which apparatus includes a broad spectrum source, a means to maintain the source a fixed distance from the ocean floor, a series of sensors, each arranged to receive the reflected electro-magnetic spectrum within a narrow spectral band, and a means for translating or moving the sensors and source over the ocean floor, along with means to indicate and/or record the amount of reflected spectrum received by each sensor.

Figure 3:
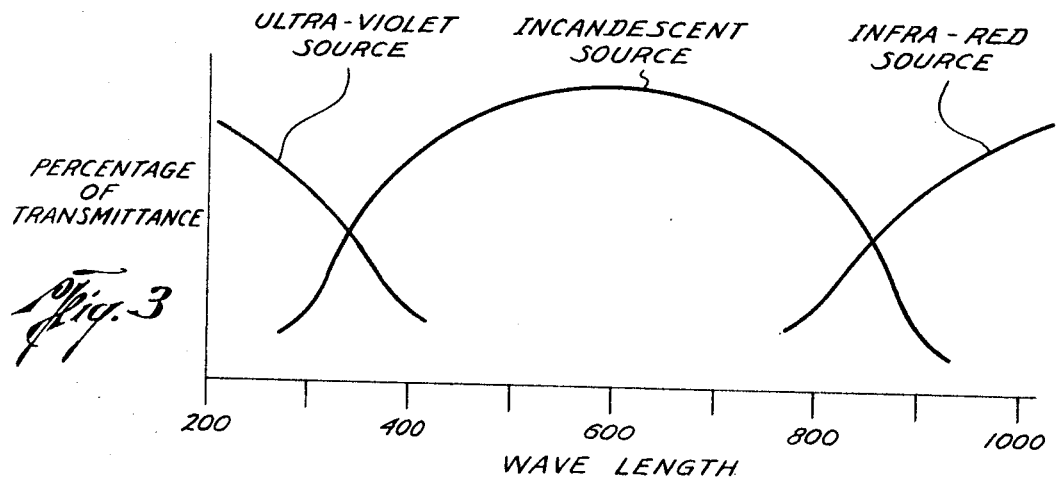
Figure 2:
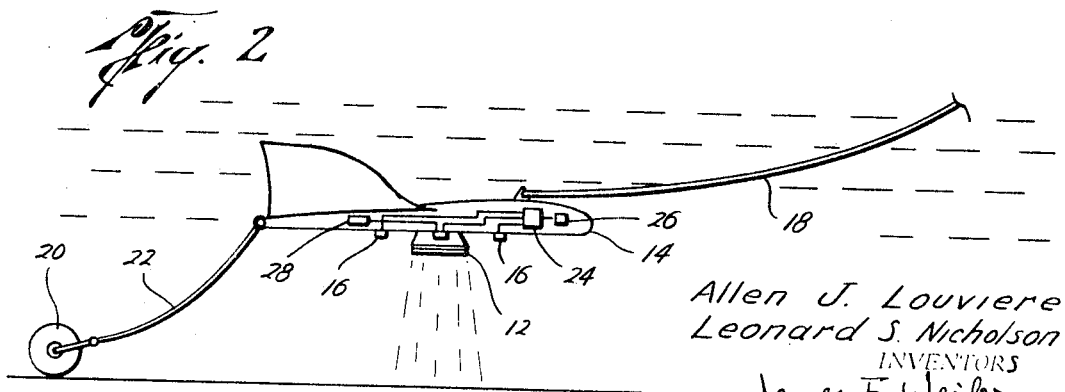
Figure 4:
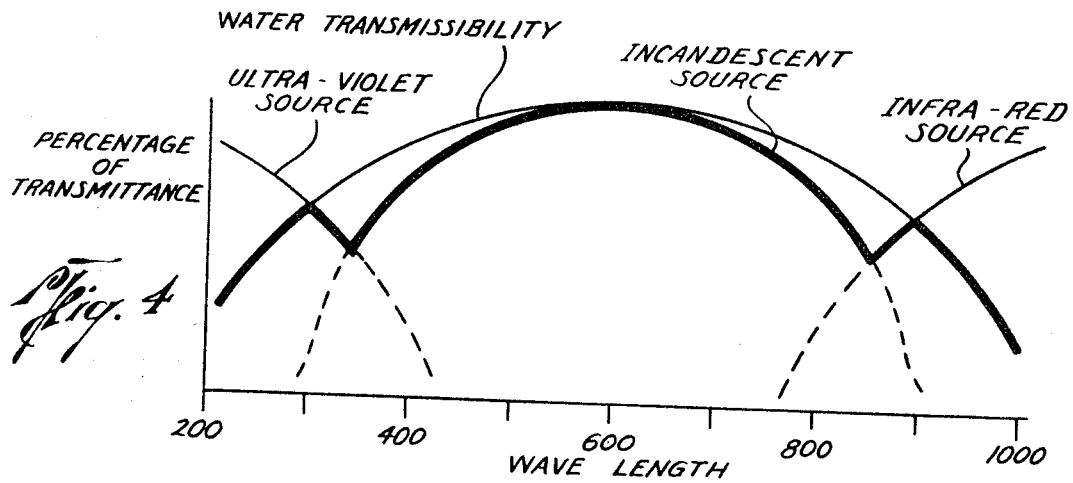
Figure 5:
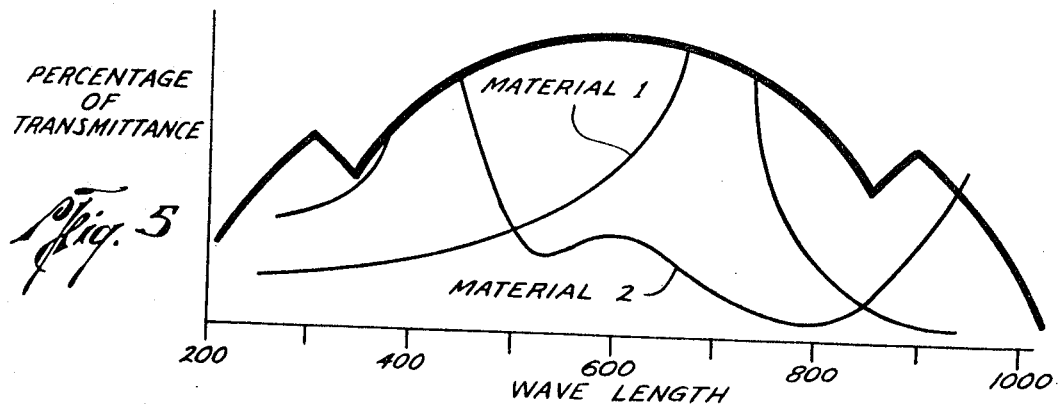
Figure 6:
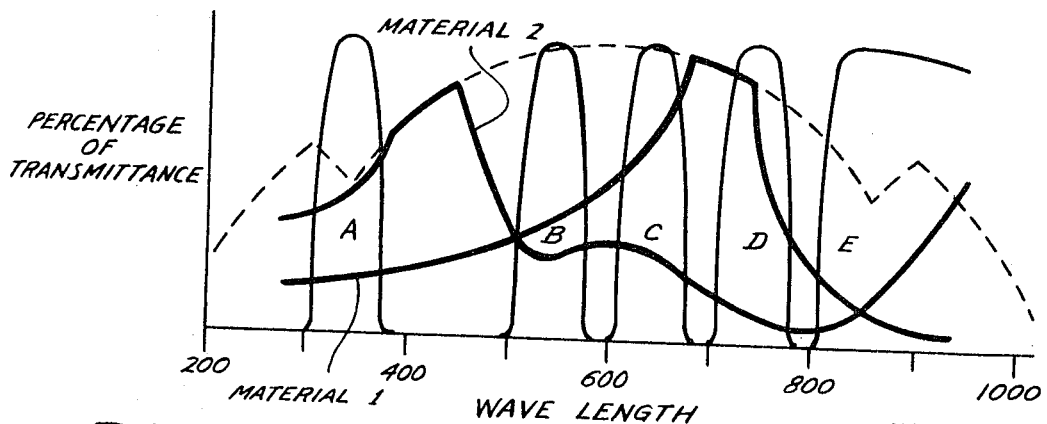

Other and further objects, features and advantages will be apparent from the following description of the presently preferred embodiment of the invention, given for the purpose of disclosure, taken in conjunction with the drawings, where like character references designate like parts throughout the several views, and where:

FIGURE 1 is an example curve showing the relative transmissibility of the electromagnetic spectrum by sea water in the spectrum FIGURE 2 is a side view showing one form of apparatus of thep resent invention, FIGURE 3 depicts curves showing the relative spectral output of the proposed electromagnetic sources, FIGURE 4 is a curve showing the transmittance range, and is a combination of the curves shown in FIGURES 3 and 1. The portion of the curve below the heavy line is the approximate amount of light which will reach the ocean floor, FIGURE 5 is a curve showing the reflected light which will be received at the sensor, for different types of materials, FIGURE 6 is a curve similar to FIGURE 5 upon which the response curves of the individual sensors have been superimposed, FIGURE 7 is an example of the type of spectral signatures within the ranges of the sensors involved which may be obtained using the present method and apparatus, and FIGURE 8 is an example of a signature of two materials as they would be recorded by a pin-recorder.

In its method sense, the present invention generally includes the steps of providing a wide band electromagnetic spectrum in a range of high transmittability of sea water, this spectrum source at a relatively fixed distance from the floor of the ocean, impinging the emitted spectrum on the ocean floor, receiving the reflected spectrum in a series of sensors, while maintaining the band width of the sensors within a narrow range, each distinct from the other sensors, and indicating the output of reflected electromagnetic spectrum of each sensor, while traversing the emitted spectrum and sensors over the ocean floor. The apparatus of the present invention includes the means for achieving the foregoing steps.

Referring now to FIGURE 1, a curve of the transmissibility of ocean water is given in percentage of transmittance plotted against millimicrons of electromagnetic spectrum wave length. Generally, ocean water provides a wide window in the visible spectrum for the transmission of electromagnetic spectrum energy and the curve given in FIGURE 1 is a generalization of this transmissibilty of ocean water. This transmittance may generally take place from approximately 250 to 900 millimicrons.

Below this in the ultraviolet range and above this in the infrared range water does not appreciably transmit the electromagnetic spectrum. It will be noted that this presently preferred spectrum window is in the visible and near visible range.

In view of the transmissibility of the electromagnetic spectrum in the range of 200–900 millimicrons of ocean water, it is further apparent that this spectrum may be reflected from the ocean floor within the same range to a greater extent than longer or shorter wave lengths, and consequently a sensor may be utilized to determine the amount of spectrum reflected. Of course, one broad band sensor may only tell whether the ocean floor is light or not, and give no indication of the reflectivity over the transmissibility range here described. Further, each material, whether it be a mineral, a marine plant growth, or marine animal, has its own "signature" or reflectance pattern curve, that is to say, the reflectivity of a particular material varies along a constant curve for that material, as the wave length changes, as is well known in the art. Examples of various curves for such materials as aluminum foil, black paint, and oxidized stainless steel are given in the book "Measurement of Thermal Radiation Properties of Solids," NASA Publication SP-31, 1963 in an article entitled "Errors Associated with Hohlraum Radiation Characteristics Determination," page 249; and for wood in an article in the same book entitled "A Simple Photometer with Wide Dynamic Range" at page 214. Further, this type of known reflectance curve for a vast number of materials forms the basis for all spectrometer work, and has been the basis for much of the publication and hardware developed for airborne multi-spectral camera equipment.

Referring now to FIGURE 3, a series of three curves showing the relative spectral output of the three electromagnetic sources. The typical high emissivity incandescent lamp will put out a usable spectrum in the range of 450 to 800 millimicrons. This wave band, when compared with FIGURE 1, is seen to be smaller than the transmissibility of ocean water. Consequently, in order to utilize the widest possible spectrum, so as to obtain a more complete signature of the ocean floor, additional spectral sources are utilized to provide electromagnetic energy in wave lengths both above and below the incandescent source, and still within the transmissibility of ocean water. Thus, an ultraviolet electromagnetic source is provided for the shorter wave lengths and an infrared source is provided for the longer wave lengths, thus providing an emitted electromagnetic spectrum completely covering the transmissibility of ocean water. However, it is possible to utilize a single source which provides sufficient energy over the spectrum of interest.

Referring now to FIGURE 4, it is thus seen that when the curves of FIGURES 1 and 3 are combined, the area beneath the heavy curve represents the electromagnetic spectrum transmitted through the water, and the relative amplitude thereof, while the area above and at either end of this heavy curve, with its proposed sources, represents the spectrum which would be absorbed and not transmitted by ocean water and would therefore be of no use with the present invention. The resultant spectrum curve in FIGURE 4 thus represents the approximate amount of the spectrum which will reach the ocean floor, and the relative amplitude thereof for various wave lengths. Of course, this does not represent the spectrum which is reflected from the ocean floor. Obviously, however, the reflected spectrum must fall within this umbrella of provided electromagnetic energy.

As previously mentioned, the amplitude of reflectivity of various materials differs with the wave length of the impinged electromagnetic spectrum on that material, and each material has a certain reflectivity curve or "signature."

Referring to FIGURE 5, the resultant spectrum curve of FIGURE 4 has been combined with the "signature" of two materials, here illustrated as materials 1 and 2. It will be noted that material 1, relative to material 2, reflects a much higher percentage of wave lengths in the 700 millimicrons range than does material 2. On the other hand, material 2 reflects wave lengths in the 400 millimicrons wave length range at a considerably higher amplitude than material 1. The reflectivity of both materials are equal at approximately 500 millimicrons and 850 millimicrons. It is now apparent that if the amplitude of reflectivity of these materials 1 and 2 were plotted against the wave lengths of received reflectivity, each material would fit within a known curve and thus could be identified.

Consequently, the present invention contemplates measuring the relative intensity of the reflected spectrum of these materials in discreet narrow bands, and then comparing this with the signatures of known materials, to determine what the particular material under consideration is. This is explained with reference to FIGURE 6.

To accomplish the foregoing purpose, a series of sensors A through E are provided, each of which will indicate reflected electromagnetic energy within a narrow band. These sensors may comprise any device suitable for the purpose, and an example of a relatively inexpensive sensor is the common photographic photocell. To provide a discreet band width for the photocell, appropriate filters are provided. Along with appropriate filters, the sensors A through E are provided. These sensors may have a range such as: sensor A being 300–375 millimicrons, sensor B being 500–575 millimicrons, sensor C being 600–675 millimicrons, sensor D being 700–775 millimicrons, and sensor E being 800 and up millimicrons. The transmissibility of ocean water limits the upper end of sensor E. These various widths are shown superimposed upon the signature curves of materials 1 and 2 in FIGURE 6. For reference, in dotted lines, the reflected spectrum curve is also given.

Referring now to FIGURE 7, the received spectral signatures within the ranges of each of the sensors is presented. Note that when the amplitude of reflectivity is measured with sensor C that it is not possible to tell the difference between materials 1 and 2, as they both reflect approximately the same intensity within this band width. However, when referring to sensor B, it is noted that material 2 reflects at a considerably higher intensity than material 1. Thus, with only sensors B and C, and the provided electromagnetic spectrum, it is possible to distinguish between materials 1 and 2. The addition of sensor D further verifies the identification of the differences between materials 1 and 2, and in this example it is noted that the relative reflected intensity of the spectrum of material 1 is considerably higher in amplitude than that of material 2 in this band width. Obviously sensors A and E give additional identification, and for other materials, would provide important data. By this method, and when comparing the resultant relative reflectivities of the materials with known curves, it is possible to accurately determine the identity of the materials making up the ocean floor being scanned by this survey technique.

The intensity readings received by the various sensors may be transmitted to a recording instrument, for example, a pin-recorder, to provide a permanent record. FIGURE 8 shows a log upon which a pin-recorder has recorded the intensity readings, or percentage of transmittance, received by sensors A through E for materials 1 and 2, which readings are also shown on the graphs of FIGURES 5–7.

Referring now to FIGURE 2, an apparatus suitable for employing the foregoing method is depicted. A spectrum source 12 is suitably mounted on a platform 14, and mounted adjacent the spectrum source 12 are two or more sensors 16, each adapted to measure the relative intensity of the reflected spectrum in a narrow band width. Suitably attached to the platform 14 is a tow line 18 which extends upwardly to a ship for pulling the platform over the ocean floor. Attached, diagrammatically, to the rear of the platform 14 is a weight 20, such as by a cable 22, which is utilized to maintain the platform, and therefore the sensors 16 and spectrum source 12, at a relatively fixed distance from the ocean floor, thus insuring constant intensity. The spectrum source may consist of an ultraviolet, an incandescent, and an infrared source (or a single integrated source), mounted within the reflector and arranged to emit the respective electromagnetic spectrums in unison to the ocean floor. The sensors may, as previously noted, comprise simple photocells with appropriate filters thereover, to restrict the range of the sensors to a discreet, narrow band width. Mounted within the platform 14 is an appropriate indicator 24 for indicating the amplitude of reflectance of each of the sensors 16, along with an appropriate recording device 26. Obviously, the recording device may be located on the ship, as may the indicators 24, rather than in the platform 14. Also indicated in FIGURE 2 is an energy source 28 which is utilized to activate the spectrum source 12. Obviously this energy source may likewise be located on the ship, or at another remote location.

Thus, it is seen that the present invention has provided a method and apparatus specially suitable for providing an underwater survey and useful in identifying the materials making up the ocean floor by means of a continuous, remote, multi-spectral survey. The present invention, therefore, is well adapted to carry out the objects and attain the ends and advantages mentioned as well as others inherent therein. While a presently preferred embodiment of the invention has been given for the purpose of disclosure, numerous changes in the details of construction, and the combination, shape, size, arrangement of parts and uses may be resorted to without departing from the spirit and scope of the appended claims.

What is claimed is:

1. An apparatus for providing a continuous, underwater, remote multi-spectral survey of the ocean floor including:
   a platform,
   means to maintain the platform a constant distance above the ocean floor,
   means to translate the platform within the water over the ocean floor,
   an electromagnetic spectrum source mounted on the platform,
   a series of sensors, each adapted to receive a discreet narrow band of spectrum, mounted on the platform,
   means to direct the spectrum from the source to the ocean floor and reflect a portion thereof to each sensor, and
   means to indicate the relative reflected intensity of the spectrum received by each sensor.

2. The invention of claim 1 wherein, the source provides a spectrum from approximately 250 through 900 millimicrons.

3. The invention of claim 2 and including, means for recording the indicated intensity of the reflected spectrum.

4. A method of remotely identifying mineral constituents of the ocean floor which constituents have known electromagnetic reflectivity curves, including the steps of:
   transmitting a predetermined spectrum of electromagnetic waves against the ocean floor, whereby a portion of the waves throughout the spectrum will be reflected by the ocean floor,
   measuring the intensity of the reflected waves in a series of discrete, relatively narrow bands spaced throughout the spectrum, and
   comparing the measured intensities with the known electromagnetic reflectivity curves to identify the mineral constituents of the ocean floor causing the reflection.

5. The invention of claim 4 wherein the transmitting step is further defined as:
   transmitting an electromagnetic wave spectrum of approximately 250 to 900 millimicrons.

6. The invention of claim 5 and including the steps of:
   translating above the ocean floor the apparatus used to perform the above steps, and
   maintaining the intensity of the electromagnetic wave spectrum transmitted against the ocean floor at a constant level.

7. A method of remotely identifying mineral constituents of the ocean floor which constituents have known electromagnetic reflectivity curves, including the steps of:
   transmitting a predetermined spectrum of electromagnetic waves toward the ocean floor,
   generating a sufficient level of energy intensity in said transmission of the electromagnetic waves so that at least a portion of said waves will contact the ocean floor and be reflected thereby,
   detecting the deflected waves in a plurality of relatively narrow bands spaced across said spectrum,
   filtering out the portions of the reflected spectrum not within said bands,
   determining the magnitude of the reflectance levels within each of said bands, and
   comparing said magnitudes with said known electromagnetic reflectivity curves to identify the mineral constituents causing said reflection.

8. The invention of claim 7 wherein said transmitting step is further defined as:
   transmitting electromagnetic waves in the wavelength range of approximately 250 to 900 millimicrons.

9. The invention of claim 8 and including the step of:
   translating above the ocean floor the apparatus used to perform the above named steps.

10. The invention of claim 9 and including the steps of:
    maintaining the intensity of the electromagnetic transmitting waves to the ocean floor at a constant level, and
    recording the reflectance level magnitudes for each of the bands.

References Cited

UNITED STATES PATENTS

| 2,573,682 | 11/1951 | Barret | 324—6 |
| 2,636,924 | 4/1953 | Lundberg et al. | 324—4 |
| 2,652,530 | 9/1953 | Davidson | 324—6 |

RICHARD A. FARLEY, *Primary Examiner.*

U.S. Cl. X.R.

324—1, 6